United States Patent
Nishikawa et al.

(10) Patent No.: US 9,750,081 B2
(45) Date of Patent: Aug. 29, 2017

(54) DIRECT DATA TRANSFER AMONG COMMUNICATION DEVICES

(71) Applicant: International Business Machines Corporation, Armonk, NY (US)

(72) Inventors: Hirofumi Nishikawa, Tokyo (JP); Tomohiro Shioya, Tokyo (JP); Kei Sugano, Tokyo (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 14/739,075

(22) Filed: Jun. 15, 2015

(65) Prior Publication Data

US 2016/0366555 A1  Dec. 15, 2016

(51) Int. Cl.
| | |
|---|---|
| *H04W 40/38* | (2009.01) |
| *H04W 84/18* | (2009.01) |
| *H04W 4/02* | (2009.01) |
| *H04W 4/00* | (2009.01) |
| *H04W 76/02* | (2009.01) |
| *H04L 12/733* | (2013.01) |

(52) U.S. Cl.
CPC ........... *H04W 84/18* (2013.01); *H04W 4/008* (2013.01); *H04W 4/022* (2013.01); *H04W 4/023* (2013.01); *H04W 76/023* (2013.01); *H04L 45/20* (2013.01)

(58) Field of Classification Search
CPC ...... H04W 4/023; H04W 40/38; H04L 12/56; H04L 12/28
See application file for complete search history.

(56) References Cited

U.S. PATENT DOCUMENTS

| | | | |
|---|---|---|---|
| 7,724,705 B2 | 5/2010 | Erola et al. | |
| 7,936,753 B1* | 5/2011 | Colloff | H04L 12/1868 370/390 |
| 8,483,616 B1* | 7/2013 | Hall | H04W 72/082 370/442 |
| 8,606,846 B2 | 12/2013 | Czechowski, III et al. | |

(Continued)

FOREIGN PATENT DOCUMENTS

| | | |
|---|---|---|
| JP | 2014033256 A | 2/2014 |
| JP | 2014086990 A | 5/2014 |
| WO | 2013138499 A1 | 9/2013 |

OTHER PUBLICATIONS

Jung et al. "Distance Estimation of Smart Device using Bluetooth". ICSNC 2013: The Eighth International Conference on Systems and Networks Communications. Copyright The Government of South Korea, 2013. Used by permission to IARIA. pp. 13-18.

(Continued)

*Primary Examiner* — Brandon Renner
(74) *Attorney, Agent, or Firm* — William H. Hartwell

(57) ABSTRACT

A method for transferring data among communication devices. The method includes a first communication device receiving, from a second communication device, data to be transferred and a condition defining a range of data transfer. The first communication device then determines whether a third communication device satisfies the condition defining the range of data transfer. On condition that the first communication device determines that the third communication device satisfies the condition, the first communication device directly transfers the data and the condition to the third communication device.

12 Claims, 12 Drawing Sheets

(56) References Cited

U.S. PATENT DOCUMENTS

| | | | |
|---|---|---|---|
| 2006/0187944 A1 | 8/2006 | Takeo et al. | |
| 2009/0016256 A1* | 1/2009 | Kim | H04B 7/1555 370/315 |
| 2010/0029207 A1* | 2/2010 | Yang | H04W 76/023 455/41.3 |
| 2011/0128959 A1* | 6/2011 | Bando | H04L 45/745 370/392 |
| 2012/0076143 A1* | 3/2012 | Liu | H04L 1/08 370/390 |
| 2012/0079045 A1* | 3/2012 | Plotkin | H04L 12/585 709/206 |
| 2012/0110121 A1* | 5/2012 | Flitcroft | G06F 17/30899 709/217 |
| 2014/0196116 A1* | 7/2014 | Maguire | H04L 51/32 726/4 |
| 2015/0004912 A1 | 1/2015 | Diamond et al. | |
| 2015/0131794 A1* | 5/2015 | Ellis | H04M 3/5133 379/265.11 |
| 2017/0096134 A1* | 4/2017 | Yoon | B60W 20/12 |

OTHER PUBLICATIONS

Nidd, M. "Service Discovery in Transient Ad-Hoc Wireless Networks", Thesis N 2481 (2001), EPFL, Lausanne, Switzerland, 2001. <http://researcher.watson.ibm.com/researcher/files/zurich-mni/main.pdf>.

Sunil et al. "Efficient Data Transmission Mechanisms for Mobile Ad Hoc Networks". International Journal of Engineering and Innovative Technology (IJEIT). vol. 3, Issue 4. Oct. 2013. pp. 269-271.

Appendix P List of IBM Patents or Patent Applications Treated as Related Filed on May 4, 2016. Two pages.

Nishikawa et al. Original U.S. Appl. No. 15/145,076, filed May 3, 2016.

* cited by examiner

DIRECT DATA TRANSFER AMONG COMMUNICATION DEVICES

BACKGROUND

The present invention relates generally to the field of data transfer between communication devices, and more particularly to direct data transfer between communication devices in a decentralized environment.

A communications device is any hardware or equipment designed to transfer information, or data (e.g., an analog or digital signal), from one place to another over a wired or wireless connection. A mobile phone, also referred to as a cellular phone, or smartphone, is one example of a communications device. Other examples include personal digital assistants (PDAs), camera phones, portable computers, wearable computers, laptops, and tablet computers.

A smartphone is a communications device that allows a user to make and receive telephone calls over a radio link while moving around a wide geographic area by connecting to a cellular network, allowing access to the public telephone network. In addition to communicating over public telephone networks and Wi-Fi networks, smartphones, as well as other computing devices, have the ability to communicate over networks known as ad-hoc networks.

A wireless ad-hoc network (WANET), is a network by which wireless devices in close proximity to each other can communicate with each other in a decentralized way. An ad-hoc network does not rely on a pre-existing infrastructure, such as routers in wired networks or access points in managed wireless networks. Instead, each node participates in routing by forwarding data for other nodes. As such, the determination of which nodes forward data is made dynamically on the basis of network connectivity.

SUMMARY

Embodiments of the present invention disclose a method, computer program product, and system for transferring data among communication devices. The method includes a first communication device receiving, from a second communication device, data to be transferred and a condition defining a range of data transfer. The first communication device then determines whether a third communication device satisfies the condition defining the range of data transfer. On condition that the first communication device determines that the third communication device satisfies the condition, the first communication device directly transfers the data and the condition to the third communication device.

DETAILED DESCRIPTION

Embodiments in accordance with the present invention recognize the need for directly transferring data to a device located in a predefined area without using a server. In some cases, excessive network traffic—due to, for example, a specific season (such as New Year's Day) or a specific place (such as an event venue)—makes it difficult to establish communications with a server. In other cases, data is preferably transmitted only to communication devices located within a certain distance from a start position of the transmission. For example, when a person is missing at an event venue, it may be helpful to spread information about that person in order to help determine that person's location at the event venue.

Figure 1:
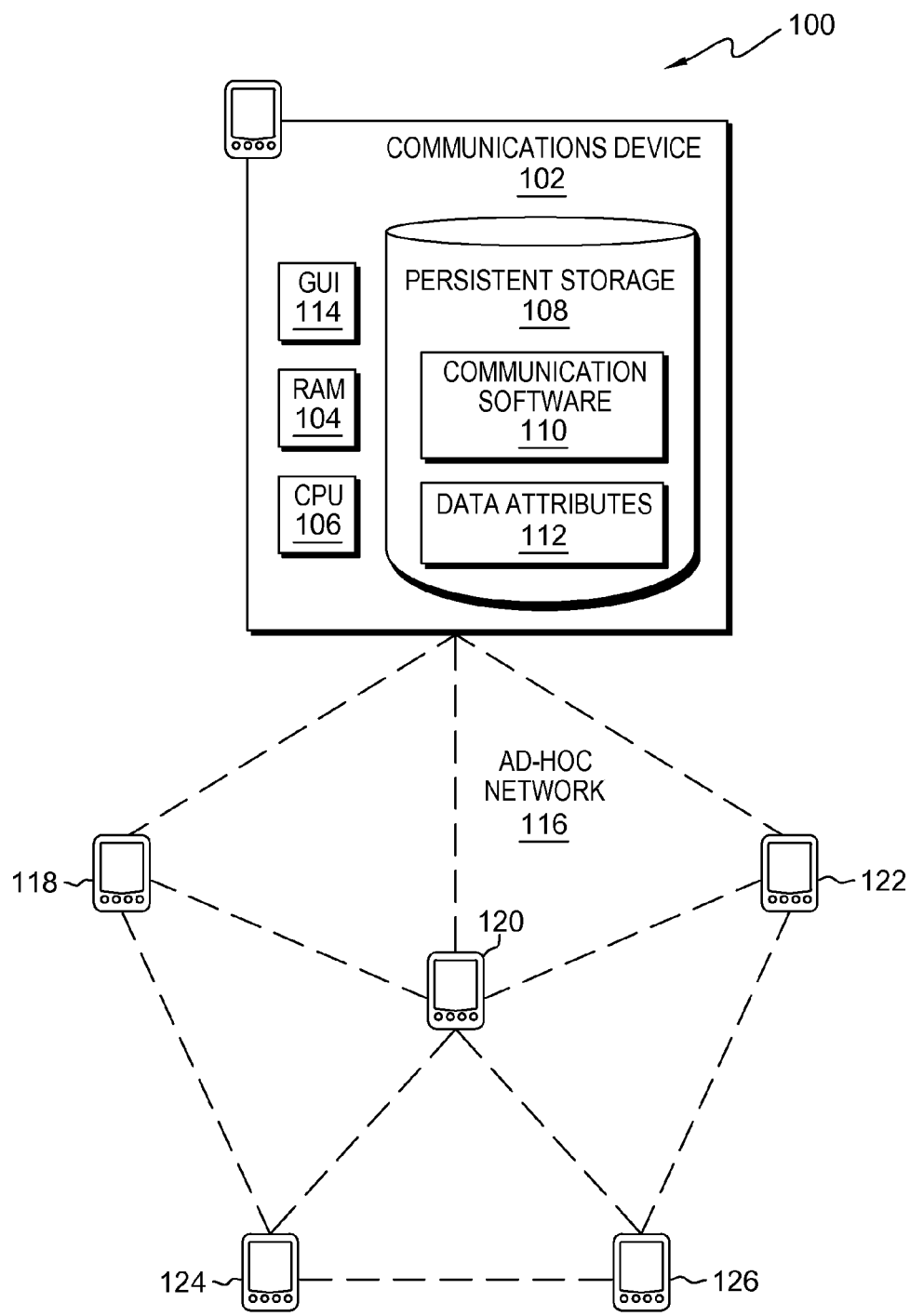
FIG. 1 is a functional block diagram illustrating a communicating device used in a decentralized communication environment, in an embodiment in accordance with the present invention.

Embodiments in accordance with the present invention will now be described in detail with reference to the Figures. FIG. 1 is a functional block diagram, generally designated 100, illustrating a communicating device used in a decentralized communication environment, in an embodiment in accordance with the present invention.

Decentralized communication environment 100 includes communications devices 102, 118, 120, 122, 124, and 126 all interconnected via ad-hoc network 116. Communications device 102 includes random access memory (RAM) 104, a central processing unit (CPU) 106, persistent storage 108 and graphical user interface 114, herein after referred to as GUI 114. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Communication software 110 and data attributes 112 are stored in persistent storage 108, which also includes operating system software, as well as software that enables communications device 102 to communicate with communications devices 118, 120, 122, 124, and 126 over a data connection on ad-hoc network 116 of the decentralized communication environment 100. Communication software 110 is stored in persistent storage 108 and enables communications device 102 to detect and connect to, or establish, ad-hoc networks. Communication software 110 also enables communications device 102 to send and receive data as well as allowing a user to set data attributes 112 via GUI 114 for allowable or desired data transfers, and estimating a position of the communication device in ad-hoc network 116 of decentralized communication environment 100. Data attributes 112 will be explained further in FIG. 2.

In FIG. 1, ad-hoc network 116 is shown as the interconnecting fabric between communications devices 102, 118, 120, 122, 124, and 126. Ad-hoc network 116 is a decentralized type of wireless network that does not rely on a pre-existing infrastructure, such as routers in wired networks, or access points in managed wireless networks. In ad-hoc networks, each node participates in routing by forwarding data for other nodes, so the determination of which nodes to forward data is made dynamically on the basis of network connectivity. In practice, ad-hoc network 116 may be any type of network where all devices have equal status on the network and are free to associate with any other wireless network device in link range. In general, ad-hoc network 116 can be any combination of connections and protocols that will support communications between communications device 102, 118, 120, 122, 124, and 126 in accordance with an embodiment of the invention.

Communications devices 118, 120, 122, 124, and 126 are communications devices analogous of communications device 102 in decentralized communication environment 100. Communications devices 118, 120, 122, 124, and 126 may all communication with one another using centralized networks, such as cellular networks and Wi-Fi networks. Additionally, communications devices 118, 120, 122, 124, and 126 may also communicate over a decentralized wireless network such as ad-hoc network 116 when it is not possible to establish communication with the controlling infrastructure (e.g., a mobile, provider, router, or wireless access point). When communicating in an ad-hoc network, wireless devices must use the same service set identifier (SSID) and the same channel number. A SSID is a unique identifier for a wireless local area network (LAN). The channel number, also referred to as the wireless local area network (WLAN) channel, refers to the allowable channels using the Institute of Electrical and Electronic Engineers (IEEE) 802.11 protocols.

Figure 2:
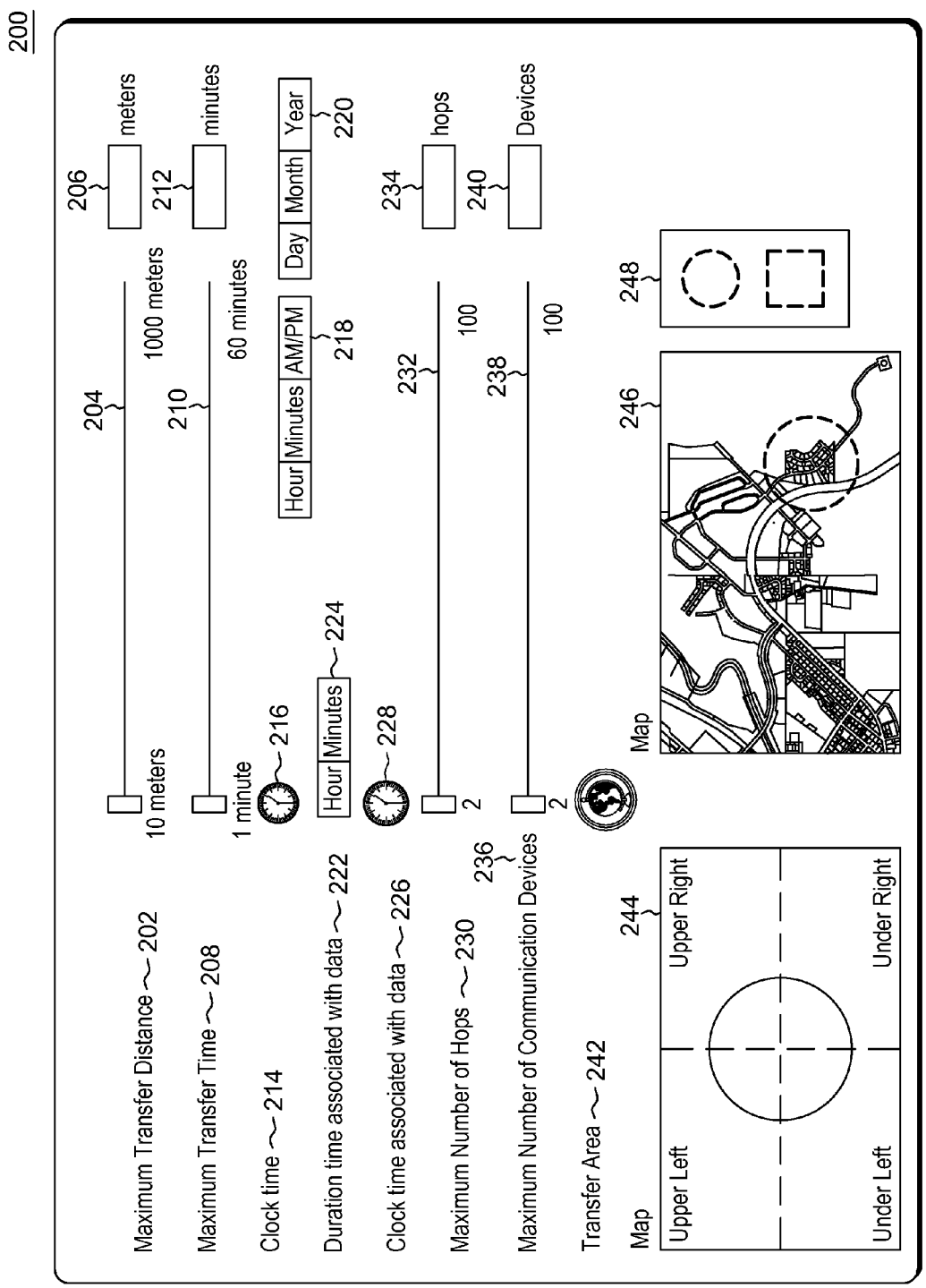
FIG. 2 illustrates a graphical user interface for setting data conditions defining a range of data transfer, on a communication device within a decentralized communication environment, in an embodiment in accordance with the present invention.

FIG. 2, generally designated 200, illustrates a graphical user interface (GUI) for setting data conditions defining a range of data transfer, on a communication device within a decentralized communication environment, in an embodiment in accordance with the present invention. User interface 200 is a program that provides an interface between a user of communications device 102 and a plurality of applications that reside on communications device 102 (e.g., communication software 110) and/or applications on computing devices that may be accessed over ad-hoc network 116. A user interface, such as GUI 114, refers to the information (e.g., graphic, text, sound) that a program presents to a user and the control sequences the user employs to control the program. A variety of types of user interfaces exist. In one embodiment, user interface 200 is a graphical user interface. GUI 114 is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. GUI 114 sends and receives information through communication software 110 to view and set operating conditions between communications device 102 and communications devices 118, 120, 122, 124, and 126, herein after referred to as intermediate communications devices, of decentralized communication environment 100.

Data attributes 112 are set by a user of communications device 102 using user interface 200 and GUI 114. Interface 200 includes a maximum transfer distance 202 that enables a user of communications device 102 to define a maximum transfer distance communications device 102 is allowed to operate in when sending and receiving data with one or more intermediate communications devices. Maximum transfer distance 202 includes a selectable slide bar 204 that allows the user of communications device 102 to select a maximum transfer distance between 10 and 1000 meters. Maximum transfer distance 202 includes an input box 206 that allows a user of communications device 102 to manually enter a maximum transfer distance between 10 and 1000 meters. In other example embodiments, the units of length for the range (i.e., maximum transfer distance) may be English units of measurement (e.g feet). In general, the maximum transfer distance may be any distance within the operating limits of a decentralized communications network.

Interface 200 also includes a maximum transfer time 208 that enables a user of communications device 102 to define a maximum transfer time communications device 102 is allowed to transmit data when sending and receiving data with one or more intermediate communications devices. Maximum transfer time 208 includes a selectable slide bar 210 that allows the user of communications device 102 to select a maximum transfer time between 1 and 60 minutes. Maximum transfer time 208 includes an input box 212 that allows a user of communications device 102 to manually enter a maximum transfer time between 1 and 60 minutes. In other example embodiments, the time (i.e., maximum transfer time), may be stored in seconds. In general, the maximum transfer time may be any time within the operating limits of a decentralized communications network.

Interface 200 also includes a clock time 214 that provides a visual indicator (e.g., clock icon 216), of the configured maximum transfer time communications device 102 is allowed to transmit data. Clock time 214 also includes time input box 218 and date input box 220 that enables a user of communications device 102 to manually enter a future time for the maximum transfer time or time frame. In other example embodiments, clock icon 216 may be a digital icon.

Interface 200 also includes clock time associated with data 222 that enables a user of communications device 102 to see how long a data transfer is taking. Clock time associated with data 222 also includes time input box 224 that allows a user of communications device 102 to manually enter a desired data transfer time (e.g., maximum transfer time 208), and clock icon 228 that provides a visual indicator of clock time associated with data 222.

Interface 200 also includes maximum number of hops 230 that enables a user of communications device 102 to enter the desired number of hops (i.e., number of intermediate communications devices) that are allowed for the data transfer. Maximum number of hops 230 includes a selectable slide bar 232 and input box 234. Selectable slide bar 232 enables a user of communications device 102 to select a maximum number of hops between 2 and 100 intermediate communication devices. Input box 234 enables a user of communications device 102 to manually enter the maximum number of hops between 2 and 200. In other example embodiments, the maximum number of hops may be entered and stored using slide bar 232 and/or input box 234. In general, the maximum number of hops may be any value within the operating limits of a decentralized communications network.

Interface 200 also includes maximum number of communication devices 236 that enables a user of communications device 102 to enter the desired number of communication devices allowed to complete the data transfer. Maximum number of communication devices 236 includes a selectable slide bar 238 and input box 240. Selectable slide bar 238 enables a user of communications device 102 to select a maximum number of communication devices allowed in the data transfer between 2 and 100 devices. Input box 240 enables a user of communications device 102 to manually enter the maximum number of communication devices allowed in the data transfer between 2 and 100 devices. In other example embodiments, the maximum number of communication devices may be entered and stored using slide bar 238 and/or input box 240. In general, the maximum number of communication devices may be any value within the operating limits of a decentralized communications network.

Interface 200 also includes transfer area 242 that provides a user of communications device 102 to view and/or select the area communications device 102 is allowed to operate within. Transfer area includes map 244 that provides a user of communications device 102 with a roadmap view of the data transfer area, and map 246 that provides the user of communications device 102 with an three dimensional or hybrid view of the data transfer area. Transfer area 242 also includes select tool 248 that allows a of communications device 102 to select a circular or square data transfer area to operate in using map 244 or map 246. In other example embodiments, the data transfer area may be selected using map 244 and/or map 246. In general, the data transfer area may be selected using any displayable map using Interface 200. In other example embodiments, Interface 200 may include parental controls, such as an age setting, to ensure data transfers that may have adult content will not be seen on intermediate communication devices where the users may be minors. In another example embodiment, Interface 200 may include a data size attribute that will limit the amount or size of data that is transferred to an intermediate communication device.

Figure 3:
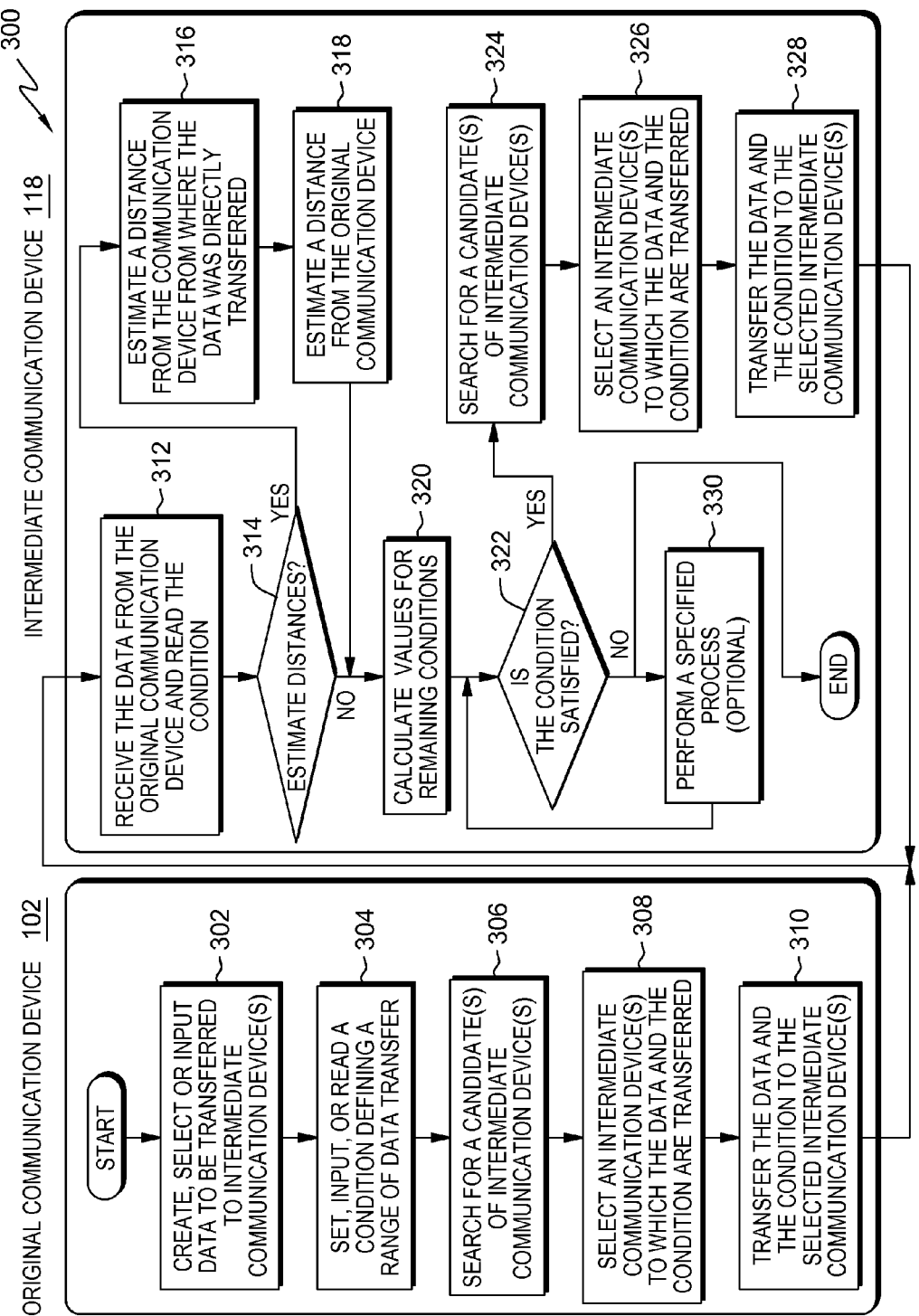
FIG. 3 is a flowchart depicting operational steps for directly transferring data among a plurality of communication devices within a decentralized communication environment, in an embodiment in accordance with the present invention.

FIG. 3 is a flowchart, generally designated 300, depicting operational steps for directly transferring data among a plurality of communication devices within a decentralized communication environment, in an embodiment in accordance with the present invention. In the example embodiment, communications device 102 is transferring data to an intermediate communication device (e.g., communications device 118). A user of communications device 102, using an application, selects a file or inputs a text message to be transferred to communications device 118 as depicted in step 302. Some examples of data that may be transmitted are pictures stored in persistent storage 108 or text messages entered by the user using GUI 114. In general, the selected or entered data may be any data capable of being transmitted by communications device 102. Selected data may be read from persistent storage 108 or an external storage device on decentralized communication environment 100. In other example embodiments, communications device 102 may use a scheduled app that automatically sends data to one or more intermediate communication devices, such as an alarm clock application that launches at a predetermined time to wake up sleeping campers using a decentralized communication network such as decentralized communication environment 100.

In step 304, the user of communications device 102 may use GUI 114, and the user interface of FIG. 2, to set, enter, or read a condition defining a range of data transfer within decentralized communication environment 100. Examples of conditions that may be viewed or set are the maximum transfer distance 202, the maximum transfer time 208, the clock time 214, the duration of time associated with the data 222, the maximum number of hops 230, the maximum number of communication devices 236, and the data transfer area 242 using map 244 and/or map 246. In one example embodiments, communications device 102 may display a popup window or display box on GUI 114 asking the user if they would like to verify or change the conditions prior to sending the data. In other example embodiments, the conditions defining the data transfer for communications device 102 may be performed once by the user and not for each data transfer initiation.

Communications device 102 then searches for one or more candidate intermediate communication devices in the ad-hoc network of decentralized communication environment 100 as depicted in step 306. In one example embodiment, communications device 102 may search for candidate intermediate communication devices by sending, or transmitting, an inquiry to surrounding intermediate communication devices, operating within the defined parameters set with GUI 114 as described in FIG. 2, and receiving a response to the inquiry from one or more candidate intermediate communication devices. In other example embodiments, candidate communication devices may be chosen from a list of candidates displayed to the user on GUI 114.

In step 308, communications device 102 selects one or more intermediate communication device(s) (e.g., communications device 118), to send the data and the one or more conditions defined for the data (i.e., data attributes 112) to. An example would be communications device 102 sending a text message to the surrounding communication devices in ad-hoc network 116 that are within 20 meters of communications device 102. In one example embodiment, the one or more candidate communication devices may be selected according to pre-defined data conditions for each individual communication device. Communications device 102 then transmits the data and data attributes 112 to the one or more selected communication devices as depicted in step 310. In other example embodiments, communications device 102 may transmit data attributes 112 prior to transmitting the data.

Intermediate communications device 118 receives the data from communications device 102, also referred to as the original communication device, and reads data attributes 112 as depicted in step 312. The original communication device may contain an accelerometer and a direction sensor, when a condition defining a range of transfer is related to a distance. It is not absolutely necessary for the original communication device to have a connection with a server, Wi-Fi® access point, or a global positioning system (GPS), because the original communication device directly communicates with the intermediate communication device using inter-device communication to directly transfer data. Optionally, when the original communication device can use a server, Wi-Fi® access point, or GPS to more correctly calculate the position of the original communication device or the intermediate communication device. In other example embodiments, the user of communications device 118 may be asked to confirm or accept the data transfer from the original communication device (i.e., communications device 102). An example of this would be a popup message on the user interface of communications device 118 (analogous to GUI 114) that asks the user of communications device 118 to accept or deny the data transfer.

In decision step 314, communications device 118 determines if it needs to estimate its distance from communications device 102 based on data attributes 112. If maximum transfer distance 202 is included as part of data attributes 112 ("Yes" branch, decision 314), communications device 118 estimates a distance from the communication device where the data was received from (i.e., communications device 102) as depicted in step 316. In step 318, communications device 118 estimates a distance from the original communication device (i.e., communications device 102) as depicted in step 316. An example of this would be communications device 118 estimating the distance from communications device 102 by using a positional presumption method based on Bluetooth and/or GPS.

As stated above, in some embodiments, the distance between communications device 118 and communications device 102 is estimated using Bluetooth. In these embodiments, Bluetooth signal strength is used to estimate the proximity of (and therefore, the distance between) communications device 118 and communications device 102. Furthermore, as stated above, in some embodiments, the distance between communications device 118 and communications device 102 is estimated using GPS. In these embodiments, the position of both communications device 118 and communications device 102 may be estimated using GPS localization technology, and the distance between the two can then be calculated using those estimated positions.

If maximum transfer distance 202 is not included as part of data attributes 112 ("No" branch, decision 314), communications device 118 calculates values for the remaining data conditions as depicted in step 320. Examples of conditions that may be calculated are the maximum transfer distance 202, the maximum transfer time 208, the clock time 214, the duration of time associated with the data 222, the maximum number of hops 230, the maximum number of communication devices 236, and the data transfer area 242 using map 244 and/or map 246. In other example embodiments, calculations of data attributes 112 may be only be performed when the data transmission has reached a defined number of hops (e.g., the maximum number of hops 230).

In decision step 322, communications device 118 determines if data attributes 112 are satisfied. If the transmitted data is not within the limits of data attributes 112 ("No" branch, decision 322), communications device 118 may perform a specified action or process for the transmitted data from communications device 102 as depicted in step 330. In one example embodiment, on condition that communications device 118 determines that the candidate communication device does not satisfy the condition(s) set in data attributes 112, communications device 118 may send a notification to communications device 102 indicating that the condition(s) are not satisfied. In another example embodiment, communications device 118, using an ad-hoc network such as decentralized communications environment 100, may display the image of an event coordinator with text asking recipients of the data transfer to ask the event coordinator to report to a location. In another example embodiment, the received data may coincide with a planned fire drill and relay a fire drill evacuation plan to all the communication devices using a decentralized communications environment such as ad-hoc network 116 in decentralized communications environment 100.

If the transmitted data is within the limits of data attributes 112 ("Yes" branch, decision 322), communications device 118 searches ad-hoc network 116 for another candidate intermediate communication device in the ad-hoc network of decentralized communication environment 100 as depicted in step 324. In step 326, communications device 118 selects one or more intermediate communication device(s) to send the data and data attributes 112 to. Communications device 118 then transmits the data and data attributes 112 to the one or more selected communication devices as depicted in step 328 and steps 312 through 330 are repeated until the defined conditions of data attributes 112 are met.

Figure 4:
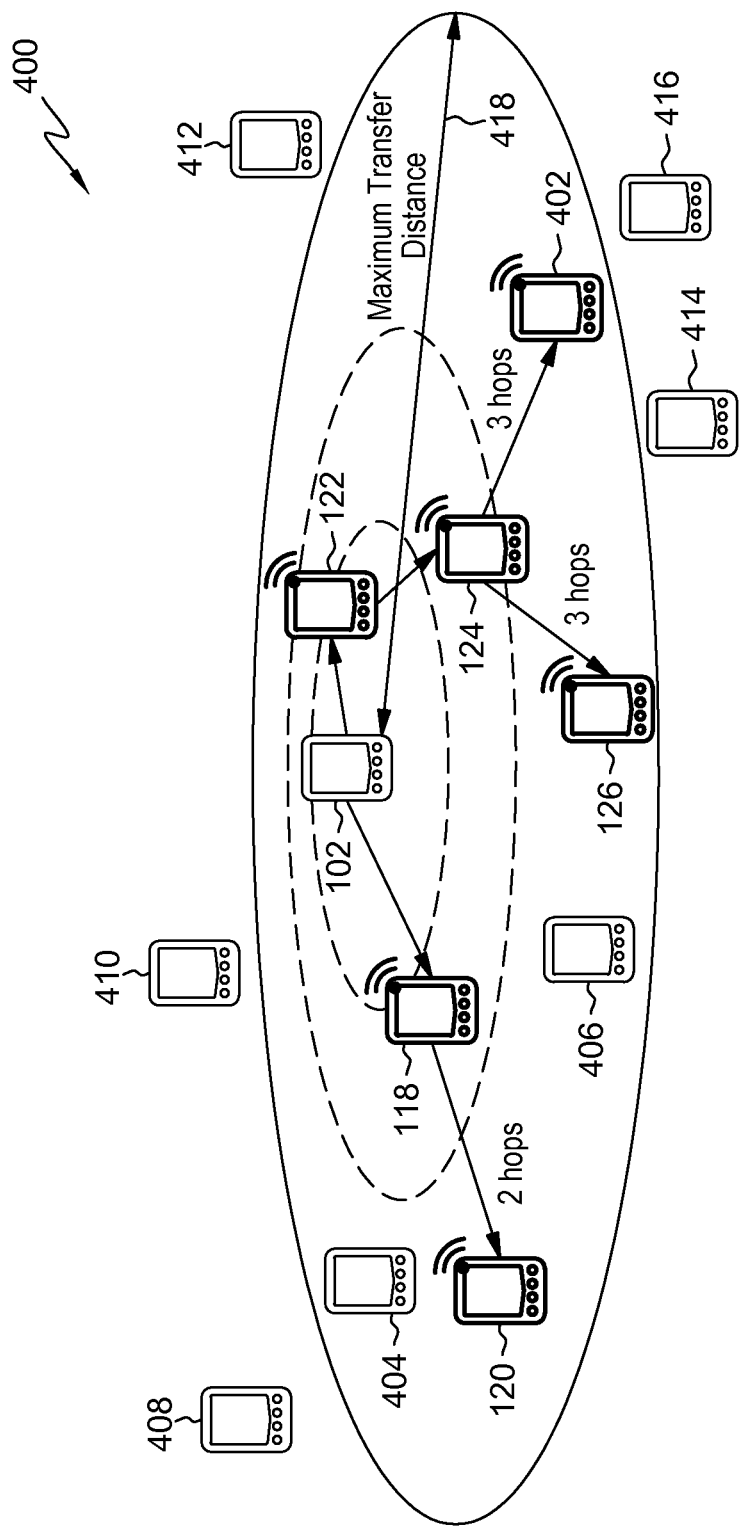
FIG. 4 illustrates a communication device directly transferring data among a plurality of communication devices, in an embodiment in accordance with the present invention.

FIG. 4 illustrates a communication device, generally designated 400, directly transferring data among a plurality of communication devices, in an embodiment in accordance with the present invention. In an example embodiment, communications device 102 is transferring data over ad-hoc network 116 with maximum number of hops 230 set to a value of "3", meaning the transferred data is only allowed to transfer to three intermediate communications devices within the maximum transfer distance 418 of ad-hoc network 116 of decentralized communications environment 100. In this example embodiment, communications device 102 transmits data to communications device 118 and 120 that are within the maximum transfer distance 202 of ad-hoc network 116 and communications device 118 only being the second hop. Since communications device 118 is close to the defined maximum transfer distance condition (e.g., maximum transfer distance 202), the transferred data is not passed on from communications device 118. In another example embodiment, the user of a communications device may move closer to the maximum transfer distance, as indicated by reference number 418, and become a third hop in the data transfer. In general, any communications device joining ad-hoc network 116 can be a candidate communications device if the data conditions defined by communications device 102 are met (i.e., steps 306 and 308 of FIG. 3).

In FIG. 4, the candidate intermediate communication devices are communications device 118, 120, 122, 124, 126, 402, 404, and 406 since they are all within the maximum number of hops defined in maximum number of hops 230. Intermediate communications devices 120, 122, 124, and 402 also receive the transmitted data and data attributes 112. Intermediate communications device 122 finds two candidate communication devices to transmit the data to (e.g., communications device 124 and 402) that are within the defined limits of data attributes 112 by communications device 102. In this example embodiment, communications device 124 and 402 are the third hop in the defined with maximum number of hops 230. In another example embodiment, communications device may update or adjust data attributes 112 dynamically while the data is being transmitted to candidate communication devices in ad-hoc network 116 of decentralized communications environment 100.

Figure 5A:
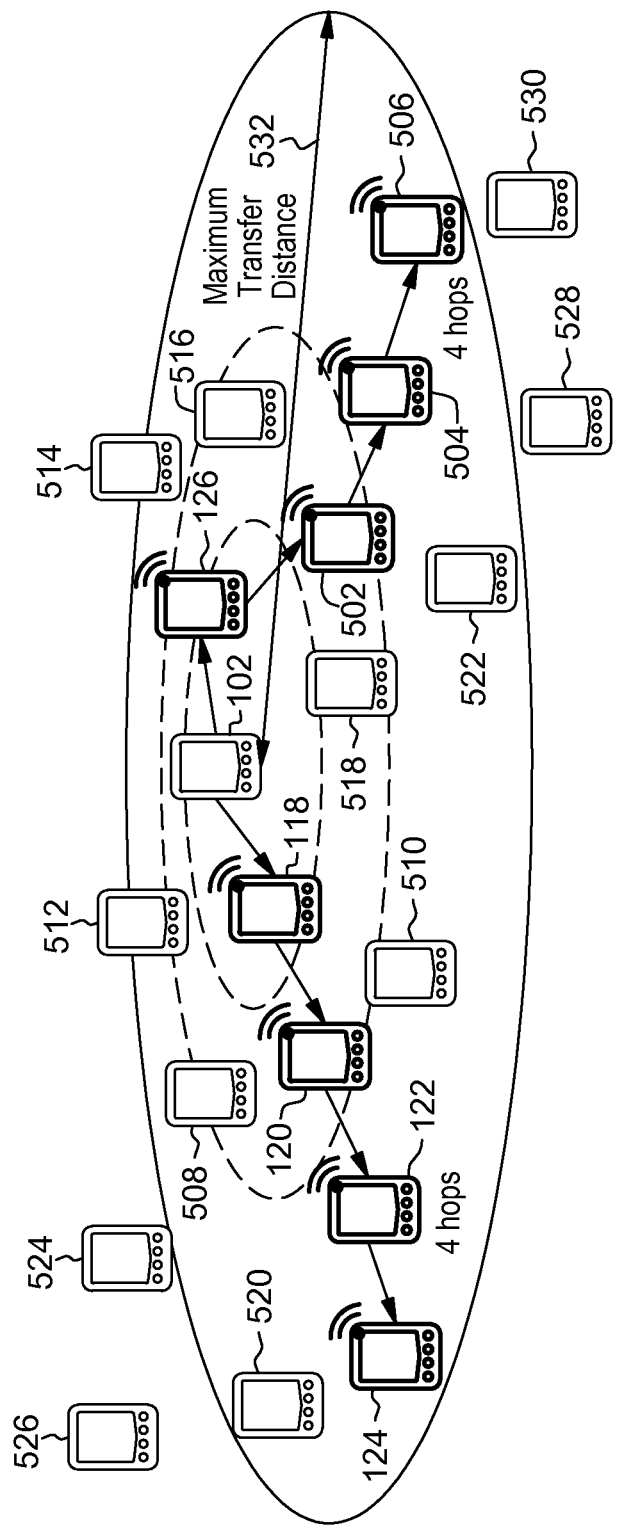
FIGS. 5A and 5B illustrate a communication device directly transferring data among a plurality of communication devices within a decentralized communication environment, using a defined number of hops and a defined number of communication devices within a maximum distance, in an embodiment in accordance with the present invention.
Figure 5B:
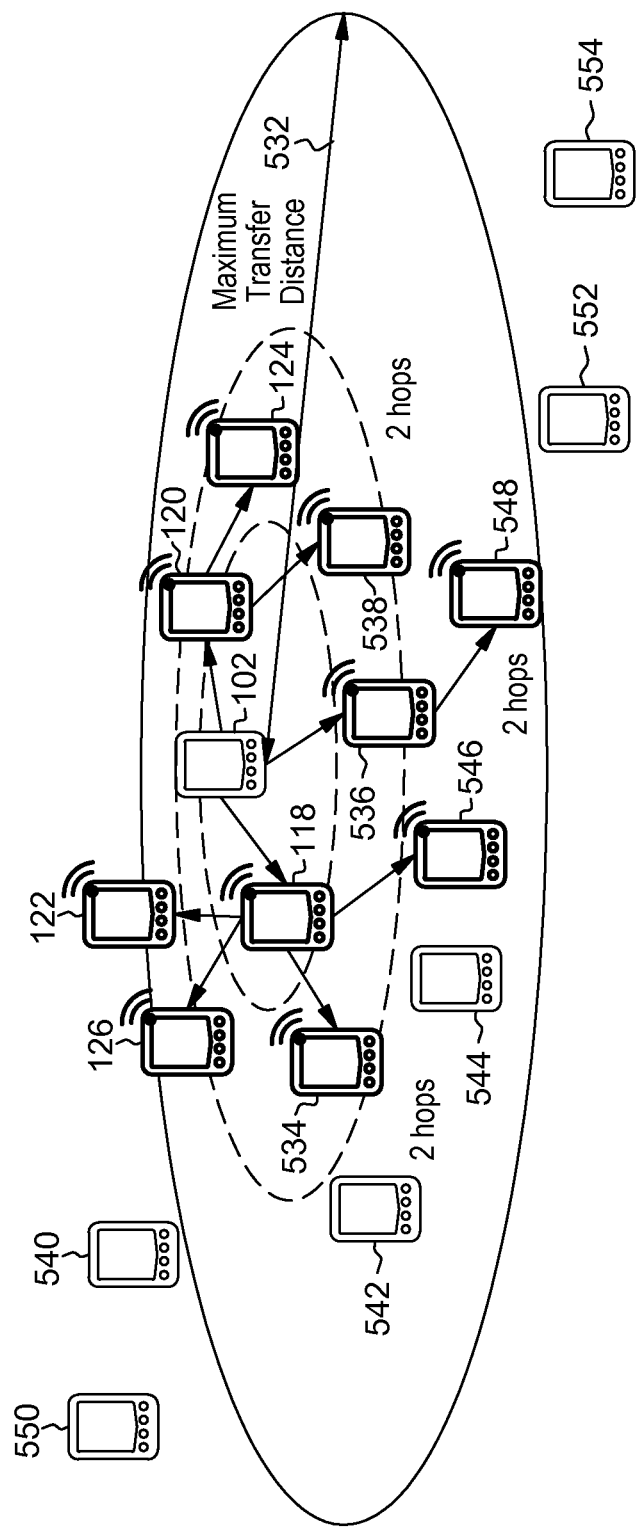

FIGS. 5A and 5B illustrate a communication device directly transferring data among a plurality of communication devices within a decentralized communication environment, using a defined number of hops and a defined number of communication devices within a maximum distance, in an embodiment in accordance with the present invention. In an example embodiment of FIG. 5A, communications device 102 is transferring data to a plurality of candidate intermediate communication devices (e.g., communications device 118, 120, 122, 124, 126, 502, 504, and 506). In the example embodiment, data attributes 112 is configured, using user interface 200 and GUI 114, to define an attribute value for maximum transfer distance 202 of "100" meters, an attribute value of the maximum number of hops 230 of "4" hops, and an attribute value for maximum number of the communication devices 236 of "1" communication device. With maximum number of the communication devices 236 set to "1", the user of communications device 102 ensures that the transmitted data is only passed on to one intermediate communication device at a time. With value of the maximum number of hops 230 set to "4" hops, communication devices 124 and 506 are both the fourth communication device in the data transfer.

Communications device 102 selects intermediate communications device 118 and 126 as the first candidates to receive the data and the defined data conditions (i.e., data attributes 112) in ad-hoc network 116. Since data attributes 112 was defined with maximum number of the communication devices 236 set to "1", each intermediate communications device to receive the transmitted data and data conditions will only select one candidate communication device to propagate the data to. In FIG. 5A, the transmitted data passes from communications device 102 to communications device 118, communications device 120, communications device 122, and communications device 124. The data also propagates from communications device 102 to communications device 126, communications device 502, communications device 504, and communications device 506. In the example embodiment of FIG. 5A, the data transfer from communications device 102 is described as a low density, extended data transfer. In a low density, extended data transfer, the number of hops from the original commutation device is many and the maximum number of communication devices to which the data is transferred is to be directly transferred is few.

In an example embodiment of FIG. 5B, communications device 102 is transferring data to a plurality of candidate intermediate communication devices (e.g., communications device 118, 120, 122, 124, 126, 534, 536, 538, 546, and 548). In the example embodiment, data attributes 112 is configured, using user interface 200 and GUI 114, to define an attribute value for maximum transfer distance 202 of "100" meters, an attribute value of the maximum number of hops 230 of "2" hops, and an attribute value for maximum number of the communication devices 236 of "4" communication device. With maximum number of the communication devices 236 set to "4", the user of communications device 102 allows the intermediate communication devices to pass the transmitted data to four intermediate communication devices at a time.

Communications device 102 selects intermediate communications device 118, 536, and 120 as the first candidates to receive the data and the defined data conditions (i.e., data attributes 112) in ad-hoc network 116. Since data attributes 112 was defined with maximum number of the communication devices 236 set to "4", each intermediate communications device to receive the transmitted data and data conditions may select up to four candidate communication device to propagate the data to as seen by communications device 118 and 120. In FIG. 5B, the transmitted data passes from communications device 118 to communications device 122, communications device 126, communications device 534, and communications device 536. The data also propagates from communications device 102 to communications device 536, and communications device 548. Communications device selects two candidate intermediate communication devices (e.g., communications device 124 and 538), to transmit the data and data attributes 112 to. In the example embodiment of FIG. 5B, the data transfer from communications device 102 is described as a high density, concentrated data transfer. In a high density, concentrated data transfer, the number of hops from the original commutation device is few and the maximum number of communication devices to which the data is transferred is to be directly transferred is many.

Figure 6:
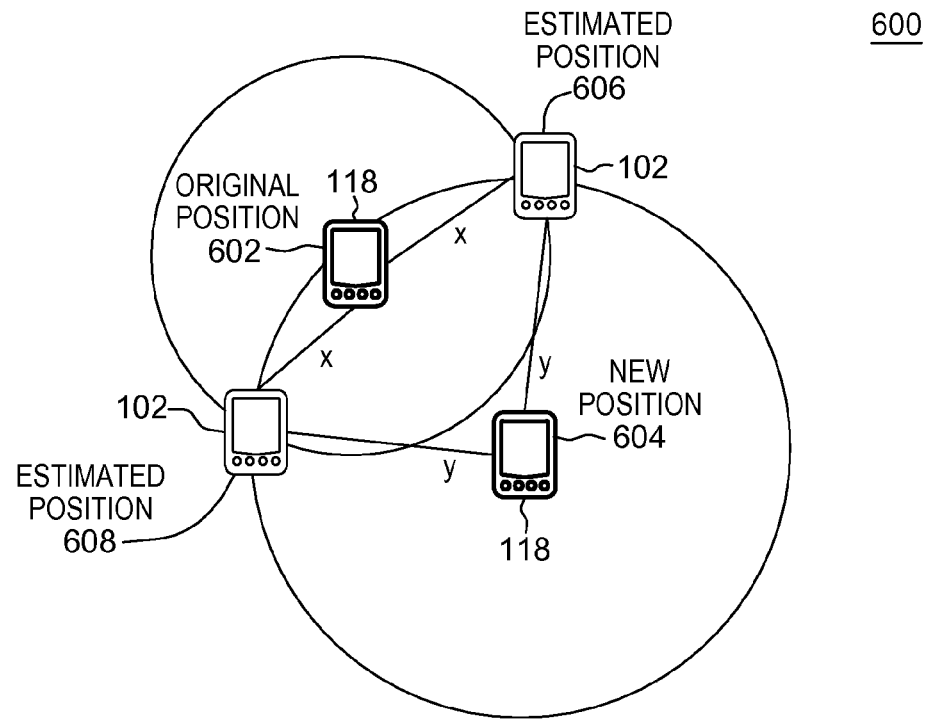
FIG. 6 illustrates a transfer map estimating a position of the original communication device within a decentralized communication environment, where the defined number of hops from the original communication device is one, in an embodiment in accordance with the present invention.
Figure 6:
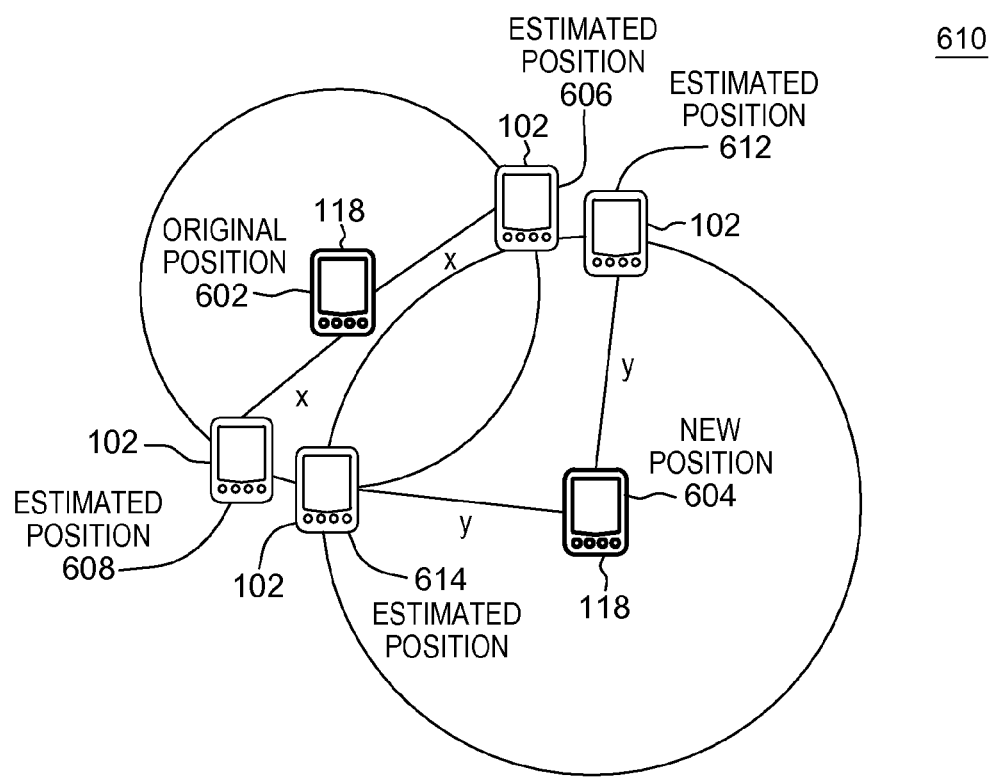

FIG. 6 illustrates a transfer map estimating a position of the original communication device within a decentralized communication environment, where the defined number of hops from the original communication device is one, in an embodiment in accordance with the present invention. A transfer map may include information on an estimated position from an original communication device to an intermediate communications device. In the example embodiment of FIG. 6, data attributes 112 is configured, using user interface 200 and GUI 114, to define an attribute value for maximum number of hops 230 of "1" hops. In the example embodiment of FIG. 6, generally designated 600, communications device 118 moves from position 602 to position 604. Prior to moving to position 604, communications device 118 estimates the communications device 102 is located on the circle having radius "x". Upon moving to location 604, communications device 118 estimates that the communications device 102 is now located on the circle having radius "y". Using the above estimated radius for "x" and "y", communications device 118 may estimate that communications device 102 may be located at position 606 or 608 where the circle having radius "x" and the circle having radius "y" intersect.

Continuing the above example embodiment of FIG. 6, in addition to communications device 118 moving from position 602 to position 604, communications device 102 also moves, as illustrated in 610. Communications device 118 may estimate that communications device 102 moves from the position 606 or 608 to position 612 or 614, on the basis of the transfer map from communications device. The transfer map of communications device 102 may include the migration length and direction of movement of communications device 102. In another example embodiment, communications device 102 may be equipped with an accelerometer and a direction sensor to measure the migration length and the direction of the movement as it moves around ad-hoc network 116 in decentralized communications environment 100. The transfer map may be delivered from the communications device 102 with the transmitted data or the transfer map.

Figure 7A:
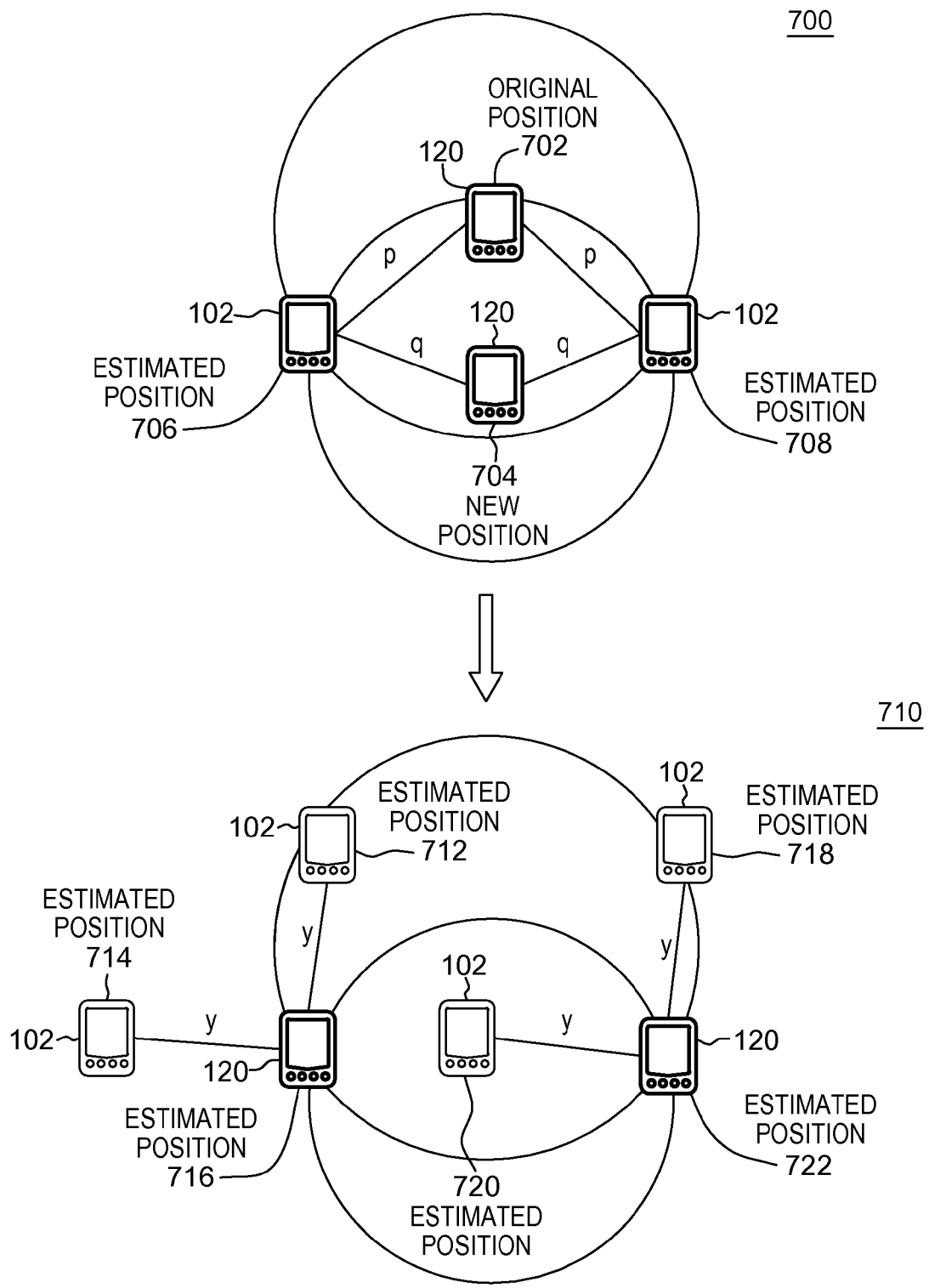
FIGS. 7A and 7B illustrates estimating a position of the communication device after moving to a new position within a decentralized communication environment, in an embodiment in accordance with the present invention.
Figure 7B:
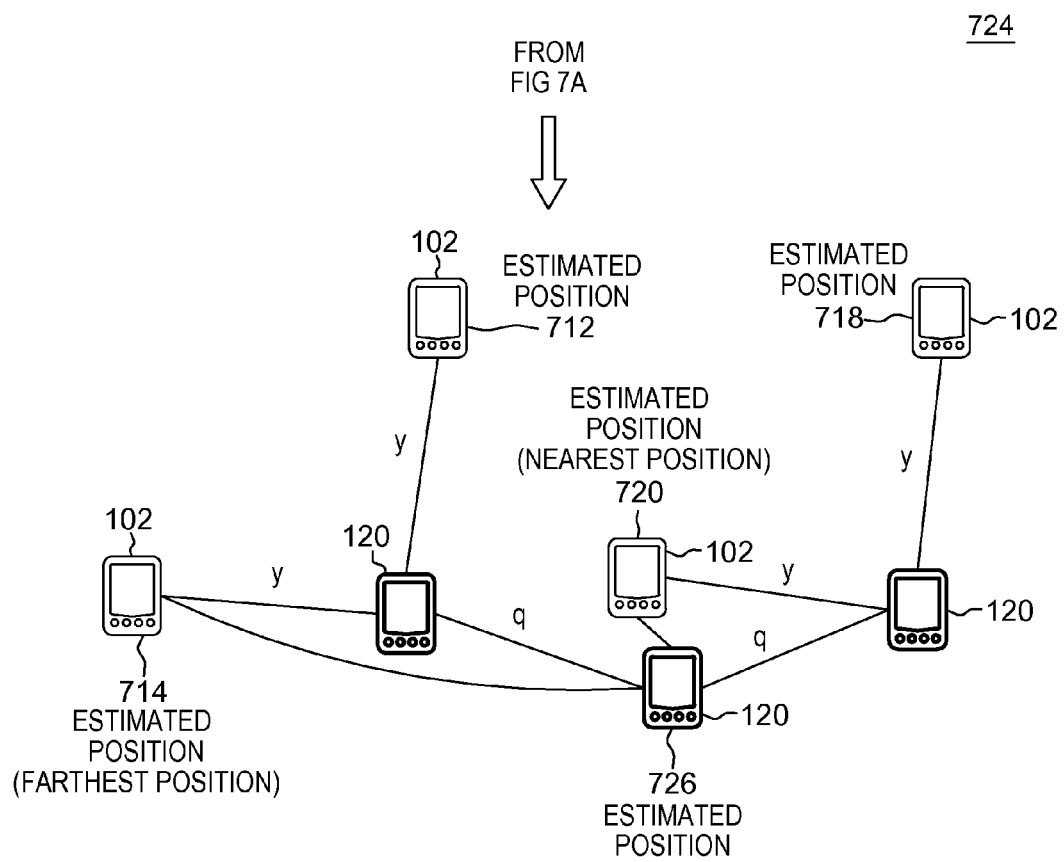

FIGS. 7A and 7B illustrate estimating a position of the communication device after moving to a new position within a decentralized communication environment, in an embodiment in accordance with the present invention. In the example embodiment of FIG. 7A, data attributes 112 is configured, using user interface 200 and GUI 114, to define an attribute value for maximum number of hops 230 of "2" hops. In the example embodiment, generally designated 700, communications device 120 moves from position 702 to position 704. Prior to moving from position 702, communications device 120 may estimates that communications device 102 locates on the circle having radius "p". Upon moving to position 704, communications device 120 now estimates that communications device 102 now locates on the circle having radius "q". Using the above calculations, communications device 120 can estimate that communications device 102 may be located at position 706 or 708 where the circle having radius "x" and the circle having radius "y" intersect.

In another example embodiment, communications device 120 may further estimate the position of communications device 102 using the estimated position 706 and 708 of communications device 120 and a transfer map from the communications device 102. The transfer map from the communications device 102 may include the migration length and direction of movement of communications device 102. In other example embodiments, the transfer map may be delivered from communications device 102 in addition to the data or the transfer map may be contained in the transferred data from communications device 102.

Continuing the above example of FIG. 7A, and as seen in 710, communications device 120 may estimate that the position of communications device 102 is at position 712 or 714 when communications device 120 is located at estimated position 716, or communications device 120 may estimate that the position of communications device 102 is at position 718 or 720 when communications device 120 is located at estimated position. Accordingly, four positions of communications device 102 are estimated from the estimated locations of communications device 120. In other example embodiments, the position of communications devices in ad-hoc network 116 may be determined using estimations received from intermediate communication devices in decentralized communications environment 100.

In FIG. 7B, as depicted in 724, the farthest estimated position of communications device 102 from the estimated position of communications device 120 is at position 726. In another example embodiment, where communications device 102 is estimated to be located at the farthest position, 714, and the estimation of communications device 120 at position 726 proves to be correct, the transfers of the data among the communication devices are made in a wider range from the original communication device. Among the four estimated positions, the nearest position of communications device 102 is from the position of communications device 120, at position 726, is estimated position 720. In other example embodiments, where communications device 102 is estimated to be located at the nearest position, (720), the transfers of the data among the communication devices are made in a narrower range from the original communication device.

As illustrated in FIGS. 6 and 7, it is possible to estimate the position of the original communication device, however, there can be more than one estimated position. When the data transfer occurs among three communication devices, it is only possible to estimate one position of the original communication device. Accordingly, if three or more communication devices are closely located, the number of the estimated positions is specified as only one. Meanwhile, if only two communication devices are located, the number of the estimated position is specified as two. In other example embodiments, where an environment allows the position information to be acquired from fixed positions and is not limited to shops, utility poles, or wireless access points, it is possible to specify a positional relationship between the communication devices. Further, if the communication device has a directional antenna, it is possible to estimate only one position of the original communication device.

Figure 8:
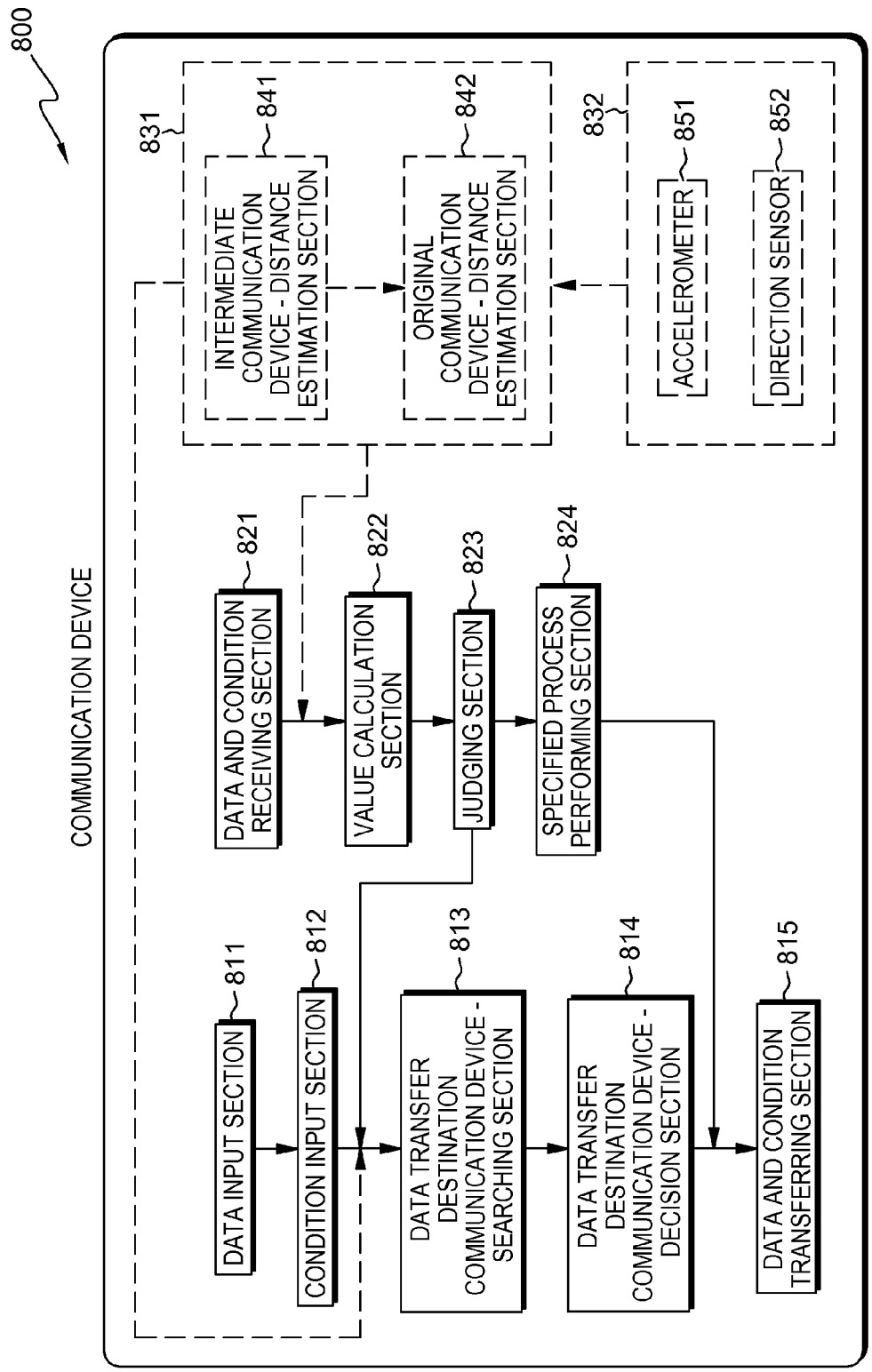
FIG. 8 is a flowchart depicting the operational steps of a communication device transmitting data within a decentralized communication environment, in an embodiment in accordance with the present invention.

FIG. 8 is a flowchart, generally designated 800, depicting the operational steps of a communication device transmitting data within a decentralized communication environment, in an embodiment in accordance with the present invention. Communications device 800 may be an original communication device (e.g., communications device 102), or an intermediate communications device (e.g., communications devices 118, 120, 122, 124, and 126). In general, communications device 800 may be any device capable of connecting to, and communicating on, ad-hoc network 116 of decentralized communications environment 100.

Communications device 800 may comprise a data input section 811, a condition input section 812, a data transfer definition communication device-searching section 813, a data transfer destination communication device-decision section 814, a data and condition transferring section 815, a data and condition receiving section 821, a value calculation section 822, a judging section 823, a specified process performing section 824. Optionally, communications device 800 may further comprise an intermediate communication device-distance estimation section 841, an original communication device-distance estimation section 842, an accelerometer 851 and direction sensor 852.

The various sections of communications device 800 may perform steps described in FIG. 3. The data input section 811 may perform step 302. The condition input section 812 may perform step 304. The data transfer definition communication device-searching section 813 may perform steps 306 and 324. The data transfer destination communication device-decision section 814 may perform steps 308 and 326. The data and condition transferring section 815 may perform steps 310 and 328. The data and condition receiving section 821 may perform step 312. The value calculation section 822 may perform steps 320. The judging section 823 may perform step 322. The specified process performing section 824 may perform step 330. The intermediate communication device-distance estimation section 841 may perform step 316. The original communication device-distance estimation section 842 may perform step 318. The accelerometer 851 may measure proper acceleration of the communication device. The direction sensor 852 may measure a direction of movement of the communication device.

Figure 9:
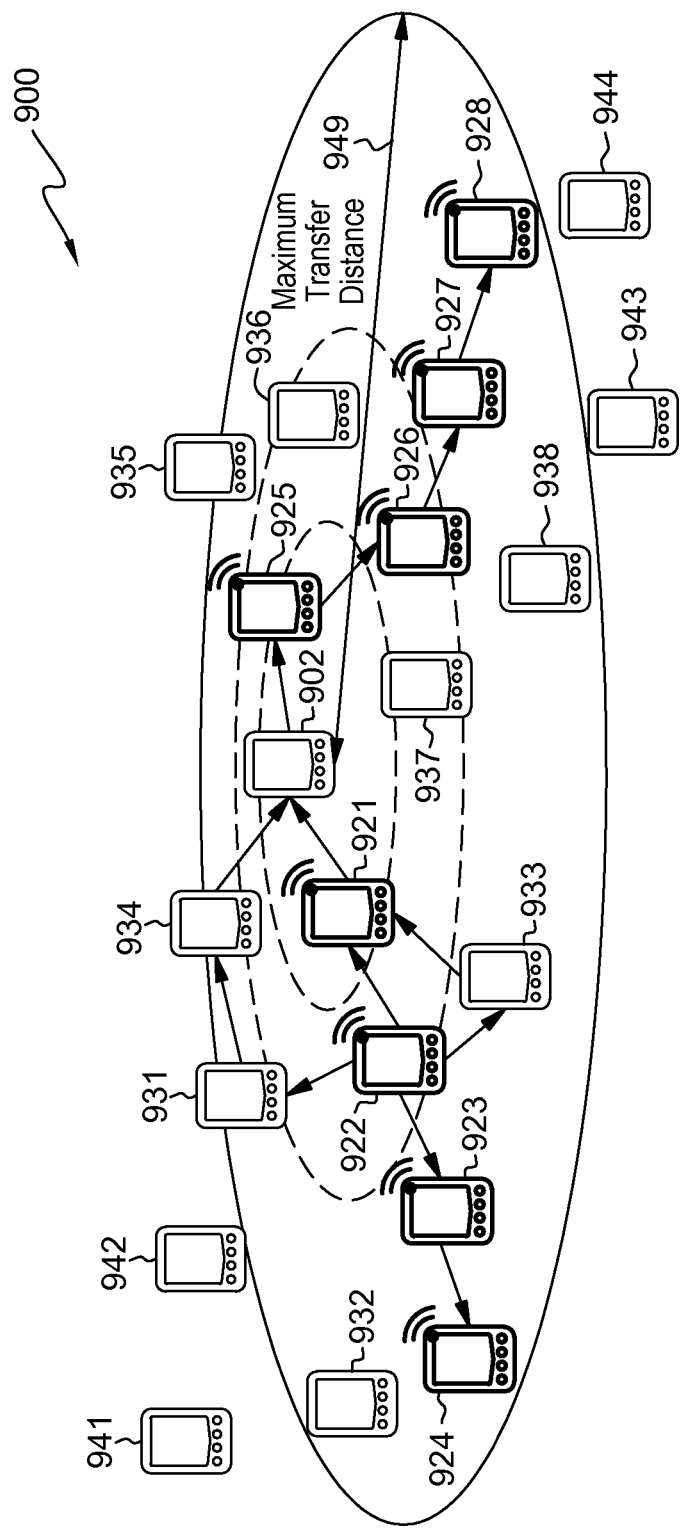
FIG. 9 illustrates a plurality of communication devices directly transferring data to search for a missing person within a decentralized communication environment, in an embodiment in accordance with the present invention.

FIG. 9, generally designated 900, illustrates a plurality of communication devices directly transferring data to search for a missing person within a decentralized communication environment, in an embodiment in accordance with the present invention. In an example embodiment, a person gets separated from his friends at an event venue. The friends may visit an information counter and ask a staff member for help. At this point the staff member, using communications device 902, uses user interface 200 and GUI 114 to enter characteristics of the missing person such as the missing person's age, gender, full name, clothes worn, characteristics of hair, date and place of birth, and when and where the missing person was last seen and by whom. If the person has been missing for a short time (e.g., ten minutes), the staff member may set a condition on the communications device 902 such that the data is transferred adjacent to communications device 902, as seen in FIG. 5B. If the person has been missing for a long period of time (e.g., fifteen minutes), the staff member may set a condition such that the data is transferred far away from the communications device 902, as seen in FIG. 5A.

In the example embodiment, it is assumed that the person has been missing for a long period of time. The staff member configures data attributes 112, using user interface 200 and GUI 114, to define an attribute value for maximum transfer distance 202 of "1000" meters, an attribute value of the maximum number of hops 230 of "100" hops, and an attribute value for maximum number of the communication devices 236 of "100" communication devices. This ensures the transmitted data would reach as many communication devices within decentralized communications environment 100.

With reference FIG. 9, let us suppose a second staff member found the missing person near intermediate communication device 922. The second staff member may take a digital photo of the person, read the digital photo into a memory of intermediate communication device 922 and, optionally, input information regarding the person. Intermediate communication device 922 may transfer the digital photo using a process similar to the one described in FIG. 3. When original communications device 902 receives the transmitted data, the digital photo is displayed to confirm that whether or not the person in the digital photo is the missing person found near intermediate communication device 922. In response to receipt of a confirmation that the person in the digital photo is the missing person who was found near intermediate communication device 922, original communications device 902 may generate data for announcing that the person was found and then transfer the generated data using a process similar to the one described in FIG. 3. If the intermediate communication device receives the data for announcing that the person was found, the intermediate communication device may transfer an instruction for stopping or cancelling the transfer of the data to another intermediate communication device. The intermediate communication device which receives the instruction may stop or cancel the transfer of the photograph and delete the photograph from a storage in order to protect leakage of individual data.

In another example embodiment, a business person would like to have lunch with an unknown business person(s). The business person may generate an invitation email on his or her smartphone and set a condition defining a range of transfer such that the maximum transfer time is five minutes after starting the transfer of the invitation email from the smartphone. The smartphone may transfer the invitation email together with the condition to an intermediate communication device(s). Accordingly, the invitation email will be transferred according to the condition. Therefore, the business person can transfer the invitation email in a specific area, such as the restaurant, and for a specific amount of time, such as five minutes.

In another example embodiment, a shop owner would like to deliver a discount coupon for his or her products. The shop owner may generate the discount coupon data on a tablet computer and set a condition defining a range of transfer such that the transfer area of the discount coupon data is set to a specific area in a transfer map. The tablet may transfer the discount coupon data together with the condition to an intermediate communication device(s). Accordingly, the discount coupon data mail will be transferred according to the condition. Therefore, the shop owner can transfer the discount coupon data during a specific time, such as off-peak time, and over a specific area.

In another example embodiment, where a person would like to get a taxi, he or she may prepare data for calling a taxi, getting his or her current position by using an app on a smartphone, and set a condition defining a range of transfer such that the maximum transfer distance is one kilometer from the smartphone. The smartphone may transfer the data together with the condition to an intermediate commutation device(s), such as, for example, a car navigation system within a taxi. The data will then be transferred to according to the condition. Therefore, the person can obtain a taxi that is near her or him.

Figure 10:
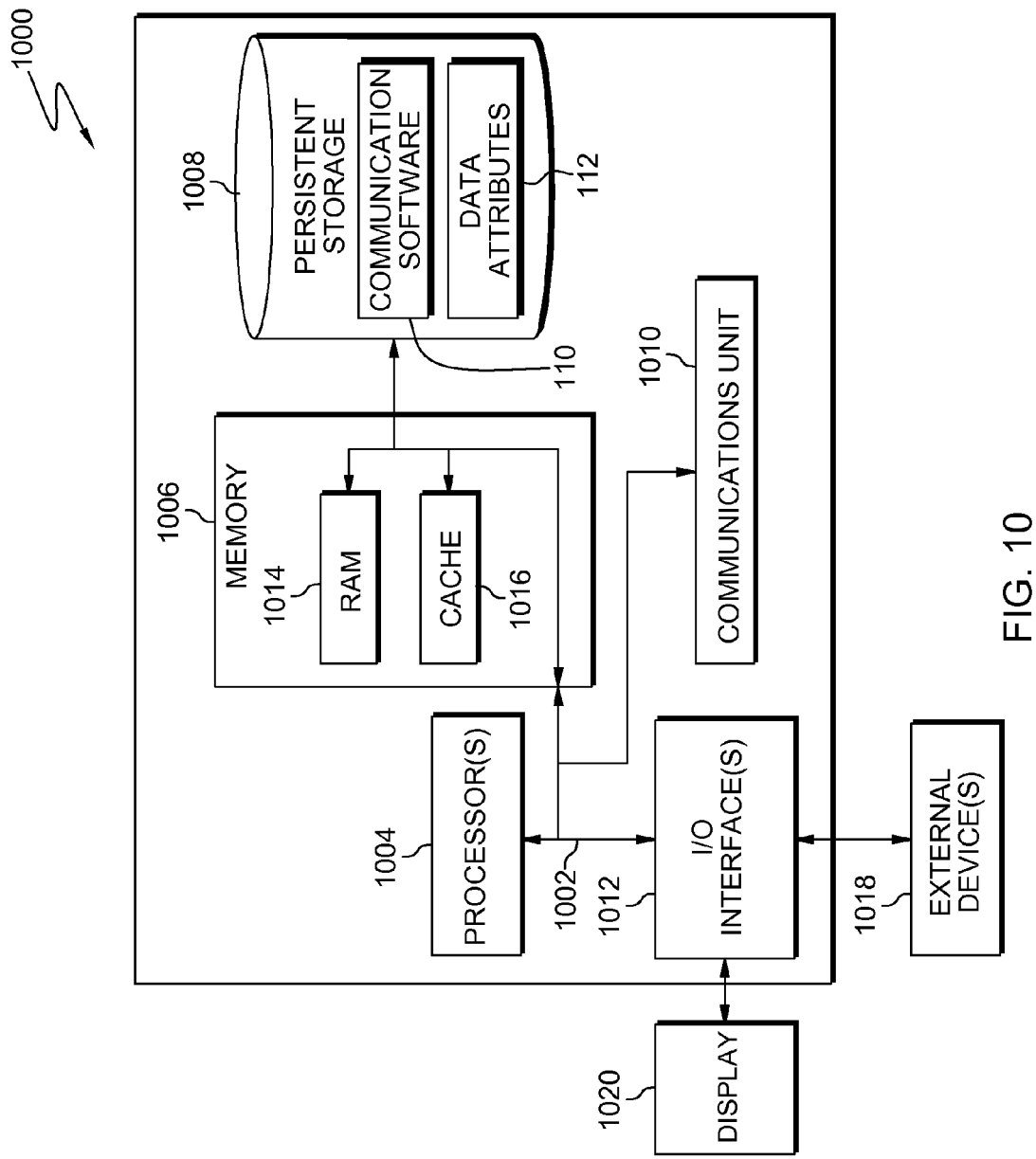
FIG. 10 depicts a block diagram of the components of a communications device, in an embodiment in accordance with the present invention.

FIG. 10 depicts a block diagram, generally designated 1000, of the components of a communications device, in an embodiment in accordance with the present invention. It should be appreciated that FIG. 10 provides only an illustration of one implementation and does not imply any limitations with regard to the environments in which different embodiments may be implemented. Many modifications to the depicted environment may be made.

Communications device 102 includes communications fabric 1002, which provides communications between computer processor(s) 1004, memory 1006, persistent storage 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer readable storage media. In this embodiment, memory 1006 includes random access memory (RAM) 1014 and cache memory 1016. In general, memory 1006 can include any suitable volatile or non-volatile computer readable storage media.

Communication software 110 and data attributes 112 are stored in persistent storage 1008 for execution by one or more of the respective computer processors 1004 via one or more memories of memory 1006. In this embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

Communications unit 1010, in these examples, provides for communications with other data processing systems or devices, including resources of ad-hoc network 116 and communications device 118, 120, 122, 124, and 126. In these examples, communications unit 1010 includes one or more network interface cards. Communications unit 1010 may provide communications through the use of either or both physical and wireless communications links. Communication software 110 and data attributes 112 may be downloaded to persistent storage 1008 through communications unit 1010.

I/O interface(s) 1012 allows for input and output of data with other devices that may be connected to communications device 102. For example, I/O interface 1012 may provide a connection to external devices 1018 such as a keyboard, keypad, a touch screen, and/or some other suitable input device. External devices 1018 can also include portable computer readable storage media such as, for example, thumb drives, portable optical or magnetic disks, and memory cards. Software and data used to practice embodiments of the present invention, e.g., communication software 110 and data attributes 112, can be stored on such portable computer readable storage media and can be loaded onto persistent storage 1008 via I/O interface(s) 1012. I/O interface(s) 1012 also connect to a display 1020.

Display 1020 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A first communication device for transferring data among communication devices, the first communication device comprising a processor, a memory, and program instructions stored in the memory for execution by the processor, the program instructions configured to:
receive, from a second communication device, data to be transferred and conditions defining a range of data transfer, wherein the conditions defining the range of data transfer include a maximum distance for the data to be transmitted, wherein the maximum distance is defined by a length, and wherein the conditions defining the range of data transfer further include a data transfer area within which the data is permitted to be transferred, wherein the data transfer area is defined by a user selection on a map, wherein the map is a geographic view of the data transfer area displayed on a user interface of the second communication device;
determine whether a third communication device satisfies the conditions defining the range of data transfer; and
on condition that the third communication device is determined to have satisfied the conditions, directly transfer, by the first communication device, the data and the conditions to the third communication device.

2. The first communication device of claim 1, wherein the first communication device is further configured to:
determine whether a fourth communication device satisfies the conditions defining the range of data transfer; and
on condition that the fourth communication device is determined to have satisfied the conditions, directly transfer the data and the conditions to the fourth communication device.

3. The first communication device of claim 1, wherein in determining whether the third communication device satisfies the conditions, the first communication device is further configured to:
search for a communication device within the range of data transfer defined by the conditions; and
responsive to the search, identify the third communication device as a communication device that is within the range of data transfer defined by the conditions.

4. The first communication device of claim 1, wherein the first communication device is further configured to:
on condition that the third communication device has been determined to not have satisfied the conditions, send a notification to the second communication device indicating that the conditions are not satisfied.

5. The first communication device of claim 1, wherein in determining whether the third communication device satisfies the conditions, the first communication device is further configured to:
estimate a distance between the first communication device and the third communication device; and
determine whether the distance between the first communication device and the third communication device is within the range of transfer defined by the conditions.

6. The first communication device of claim 5, wherein:
the distance between the first communication device and the third communication device is estimated using global positioning system (GPS) and Bluetooth.

7. A computer program product for transferring data among communication devices, the computer program product comprising:
one or more computer readable storage media and program instructions stored on the one or more computer readable storage media, wherein the computer readable storage media are not transitory signals per se, the program instructions comprising:
program instructions to receive, from a second communication device, data to be transferred and conditions defining a range of data transfer, wherein the conditions defining the range of data transfer include a maximum distance for the data to be transmitted, wherein the maximum distance is defined by a length, and wherein the conditions defining the range of data transfer further include a data transfer area within which the data is permitted to be transferred, wherein the data transfer area is defined by a user selection on a map, wherein the map is a geographic view of the data transfer area displayed on a user interface of the second communication device;
program instructions to determine whether a third communication device satisfies the conditions defining the range of data transfer; and
program instructions to, on condition that the third communication device is determined to have satisfied the conditions, directly transfer, by the first communication device, the data and the conditions to the third communication device.

8. The computer program product of claim 7, wherein the program instructions further comprise:
program instructions to determine, by the first communication device, whether a fourth communication device satisfies the conditions defining the range of data transfer; and
program instructions to, on condition that the first communication device determines that the fourth communication device satisfies the conditions, directly transfer, by the first communication device, the data and the conditions to the fourth communication device.

9. The computer program product of claim 7, wherein the program instructions to determine whether the third communication device satisfies the conditions further comprise:
program instructions to search for a communication device within the range of data transfer defined by the conditions; and
program instructions to, responsive to the search, identify, by the first communication device, the third communication device as a communication device that is within the range of data transfer defined by the conditions.

10. The computer program product of claim 7, wherein the program instructions further comprise:
program instructions to, on condition that the third communication device has been determined to not have satisfied the conditions, send a notification, by the first communication device, to the second communication device indicating that the conditions are not satisfied.

11. The computer program product of claim 7, wherein the program instructions to determine whether the third communication device satisfies the conditions comprise:
program instructions to estimate a distance between a first communication device and the third communication device; and program instructions to determine whether the distance between the first communication device and the third communication device is within the range of transfer defined by the conditions.

12. The computer program product of claim 11, wherein: the distance between the first communication device and the third communication device is estimated using global positioning system (GPS) and Bluetooth.

* * * * *